US006163824A

United States Patent [19]

Quackenbush et al.

[11] Patent Number: 6,163,824

[45] Date of Patent: *Dec. 19, 2000

[54] HOT PLUG PORT ADAPTER WITH SEPARATE PCI LOCAL BUS AND AUXILIARY BUS

[75] Inventors: William L. Quackenbush, Palo Alto; Charles J. Naegeli, Montara; David J. Tsiang, Menlo Park; John T. Chapman, Cupertino; Glenn Lee, Fremont, all of Calif.

[73] Assignee: Cisco Technology, Inc., San Jose, Calif.

[ * ] Notice: This patent is subject to a terminal disclaimer.

[21] Appl. No.: 09/206,762

[22] Filed: Aug. 10, 1998

Related U.S. Application Data

[63] Continuation of application No. 08/685,941, Jul. 22, 1996, Pat. No. 5,793,987.

[60] Provisional application No. 60/015,805, Apr. 18, 1996.

[51] Int. Cl.[7] .............................. G06F 13/00

[52] U.S. Cl. .............................. 710/100; 710/100

[58] Field of Search .............................. 710/100, 126, 710/128, 8, 101, 102

[56] References Cited

U.S. PATENT DOCUMENTS

| | | | |
|---|---|---|---|
| 3,728,693 | 4/1973 | Macker et al. | 340/172.5 |
| 4,262,302 | 4/1981 | Sexton | 358/10 |
| 4,394,734 | 7/1983 | Norgren et al. | 364/200 |
| 4,750,136 | 6/1988 | Arpin et al. . | |
| 4,835,737 | 5/1989 | Herrig et al. . | |
| 5,268,592 | 12/1993 | Bellamy et al. . | |
| 5,305,284 | 4/1994 | Ashby et al. | 380/29 |
| 5,386,514 | 1/1995 | Lary et al. | 395/250 |
| 5,386,567 | 1/1995 | Lien et al. . | |
| 5,491,804 | 2/1996 | Heath et al. . | |
| 5,499,346 | 3/1996 | Amini et al. | 395/308 |
| 5,519,715 | 5/1996 | Hao et al. | 395/183.06 |
| 5,519,872 | 5/1996 | Khandekar et al. | 395/775 |
| 5,530,302 | 6/1996 | Hamre et al. | 307/147 |
| 5,579,491 | 11/1996 | Jeffries et al. | 395/283 |
| 5,793,987 | 8/1998 | Quackenbush et al. | 395/280 |

OTHER PUBLICATIONS

CISCO News Release written by Steve Bauer entitled CISCO 7000 Gains Fast Ethernet Interface, Becomes Only Router Family to Support Three High–Speed Network Types released on Mar. 28, 1995.

Addendum to CISCO News Release written by Steve Bauer entitled CISCO 7000 Gains Fast Ethernet Interface, Becomes Only Router Family to Support Three High–Speed Network Types released on Mar. 28, 1995 entitled Summary of Port Adapter and Fast Ethernet Interface Processor History.

*Primary Examiner*—Glenn A. Auve
*Assistant Examiner*—Tim Vo
*Attorney, Agent, or Firm*—Marger Johnson & McCollom, PC

[57] ABSTRACT

A pluggable port adapter is used for connecting PCI devices to a host system through a PCI local bus while also adding functionality to the host system. The port adapter communicates with the host system through a port adapter/host interface that includes the PCI local bus and an auxiliary bus. The auxiliary bus is used for controlling the additional circuitry on the port adapter. A PROM on the adapter card is used for identifying the port adapter type, serial number and hardware revision. The auxiliary bus is used for conducting JTAG testing and is used by the host system to program logic devices on the port adapter. The logic devices can be reprogrammed in the field by the host system to repair bugs and to enhance performance and/or functionality. A power control circuit on the port adapter is controlled by the auxiliary bus for conducting hot swap operations.

7 Claims, 5 Drawing Sheets

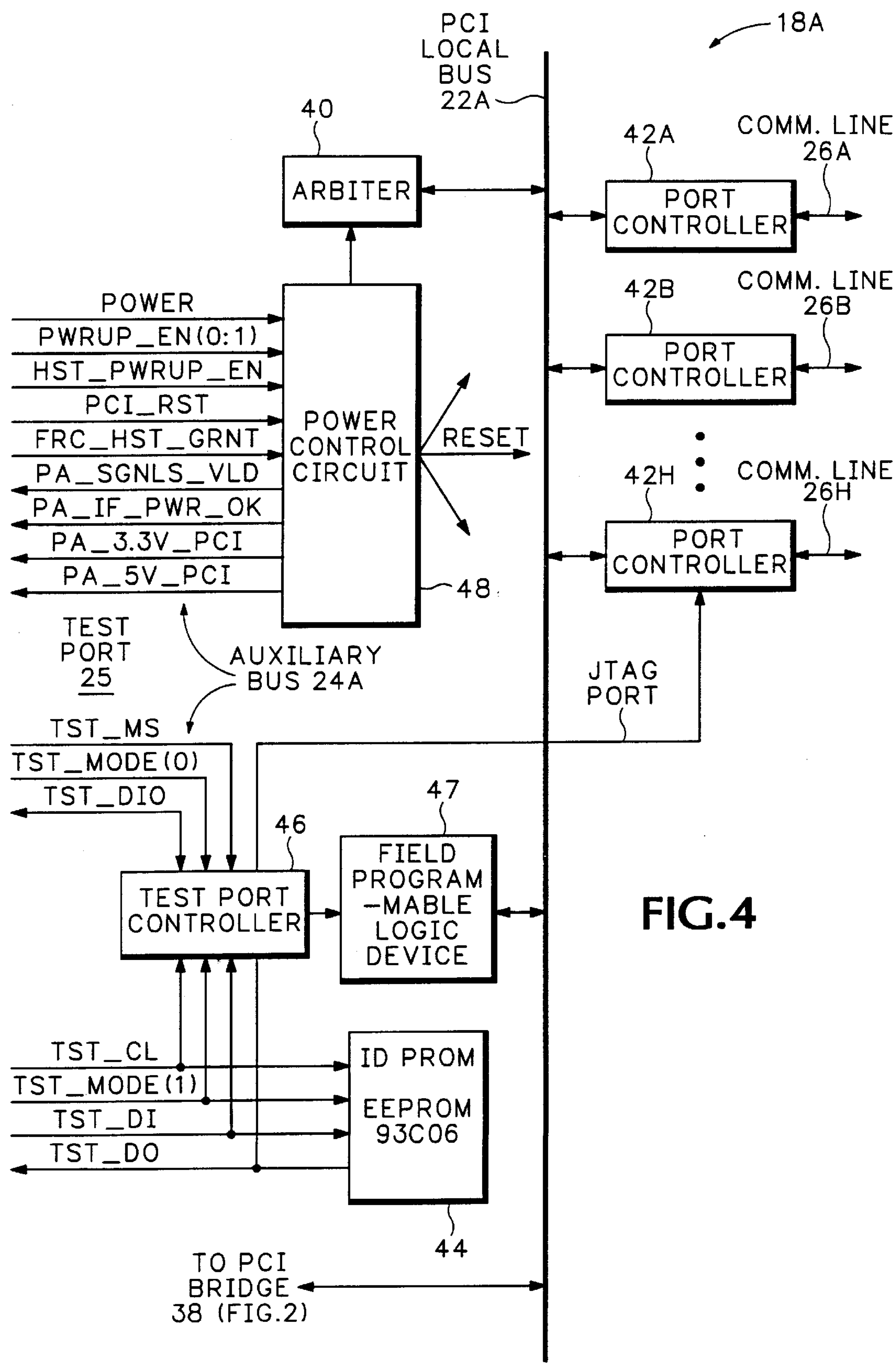
18A
PCI LOCAL BUS 22A
40
ARBITER
42A
COMM. LINE 26A
PORT CONTROLLER
42B
COMM. LINE 26B
PORT CONTROLLER
42H
COMM. LINE 26H
PORT CONTROLLER
POWER
PWRUP_EN(0:1)
HST_PWRUP_EN
PCI_RST
FRC_HST_GRNT
PA_SGNLS_VLD
PA_IF_PWR_OK
PA_3.3V_PCI
PA_5V_PCI
POWER CONTROL CIRCUIT
RESET
48
TEST PORT 25
AUXILIARY BUS 24A
JTAG PORT
TST_MS
TST_MODE(0)
TST_DIO
46
47
TEST PORT CONTROLLER
FIELD PROGRAM -MABLE LOGIC DEVICE
FIG.4
TST_CL
TST_MODE(1)
TST_DI
TST_DO
ID PROM
EEPROM 93C06
44
TO PCI BRIDGE 38 (FIG.2)

HOT PLUG PORT ADAPTER WITH SEPARATE PCI LOCAL BUS AND AUXILIARY BUS

CO-PENDING APPLICATION

This is a con of 08/685,941 Jul. 22, 1996 U.S. Pat. No. 5,793,987. This application claims the benefit of U.S. Provisional Application No. 60/015,805, filed Apr. 18, 1996.

FIELD OF THE INVENTION

This invention relates to digital computer based systems and more particularly to digital computers that include a PCI (Peripheral Component interconnect) local bus.

BACKGROUND OF THE INVENTION

Digital computers use input/output (I/O) buses for transferring information between peripheral devices and a computer central processing unit and computer memory. I/O functions are also required in systems with multiple distributed processors and multiple distributed memories.

There are a variety of widely used I/O bus architectures such as ISA (Industry Standard Architecture bus) and EISA (Extended Industry Standard Architecture bus). A relatively new bus architecture is the PCI local bus. The PCI Local Bus Specification for the PCI local bus is available from the PCI Special Interest Group, 5200 Elam Young Parkway, Hillsboro, Oreg.

In general, before a peripheral device communicates and transfers data over the PCI local bus, the device must be configured using PCI local bus configuration space commands. For example, the peripheral device may include command registers, timers, memory base, limit registers and other control circuits that may require configuration.

In some systems, it may be desirable that other functions be conducted in conjunction with some peripheral devices. However, in some situations, the PCI local bus may not be suitable for conducting some of the operations related to the additional functions. For example, field programmable gate array devices which include volatile programming memory can be connected to the PCI local bus. Such a device must be programmed each time it is powered up, but can not be programmed over the PCI local bus since the device must be programmed before interacting with the PCI local bus. Powered on devices might be connected or disconnected from the PCI local bus (Hot Swap) while other devices on the PCI local bus remain powered on. Hot swapping can corrupt logical states in PCI devices and corrupt data being transferred on the PCI local bus.

Hot swapping may also damage some devices connected to the PCI local bus such as devices using Complimentary Metal Oxide Semiconductor (CMOS) technology. CMOS devices are exposed to large currents when inputs to CMOS receivers are within the CMOS switching region. Some CMOS receivers have two field effect transistors (FETs) connected in series with a first FET connected to a positive power supply rail and a second FET connected to a negative power supply rail. When the input to the two FETS is in the switching region, both FETs can be continuously turned on at the same time creating a DC current path directly through the CMOS device. The continuous on state of the two FETs can dissipate enough power to damage the CMOS device.

CMOS devices also experience latch-up conditions when an input is driven beyond one of the CMOS power supply rails. In the latch-up condition, parasitic transistors in the CMOS structure dissipate large amounts of power that can destroy the CMOS device. Both power dissipation conditions described above can result from hot swapping on the PCI local bus.

SUMMARY OF THE INVENTION

A pluggable port adapter is used to connect one or more PCI agents to a host system through a PCI local bus to add functionality to the host system. A PCI agent is a device attached to a PCI local bus that is capable of functioning as a PCI local bus initiator and/or target compliant to the PCI local bus specification. The port adapter communicates with the host system through a port adapter/host interface that includes the PCI local bus and an auxiliary bus. The PCI agents are configured and communicate in a normal manner over the PCI local bus while other functionality on the port adapter is controlled independently through the auxiliary bus.

The host system uses the auxiliary bus to determine the identity of a port adapter which the host system then uses to determine what programming and configuration is required. The auxiliary bus is also used by the host system for testing devices on the port adapter and programing circuitry on the port adapter such as field programmable gate arrays (FPGAs). FPGAs with volatile program memory must be programmed each time they are powered up and can be reprogrammed in the field by the host system to repair bugs and to enhance performance and/or functionality.

In one embodiment of the invention, the PCI local bus in the port adapter is coupled to one or more port controllers each connecting to one or more communication lines such as local area networks (LAN) like ethernet and wide area networks (WAN). In another embodiment of the invention, devices other than communication line controllers are connected to the PCI local bus. For example, logic on the port adapter performing different functions such as data encryption/decryption and data compression/decompression is connected to the PCI local bus.

The logic receives data from the PCI local bus and then retransmits the data on the PCI local bus in a reprocessed form. The auxiliary bus is used for programmable logic on the port adapter such as logic implemented with an FPGA.

The auxiliary bus is also used for conducting hot swap operations in which the port adapter is unplugged from the host system while the host system is powered and operating. The port adapter includes a connector with two power enable pins that are shorter than other auxiliary bus pins and PCI local bus pins. The shorter power enable pins allow the port adapter and host system to anticipate and, in turn, respond to a hot swap condition.

When the port adapter is connected to the host system during a hot swap condition, control circuitry starts a controlled power-up sequence. When the port adapter is disconnected from the host system during a hot swap condition, the control circuitry starts a controlled power-down sequence.

A hot swap protocol between the port adapter and the host system discontinues data communications on the PCI local bus in the port adapter when the port adapter is not at an operational power level. When the port adapter is disconnected from the host system, signals coming from host bridge circuitry are driven to known safe states to prevent potentially high currents from damaging devices during on-line insertion operations. The hot swap protocol also prevents corruption of data on the PCI local bus and corrupting logic states in the host.

BRIEF DESCRIPTION OF DRAWINGS

FIG. 4 is a detailed block diagram for the port adapter according to another embodiment of the invention having additional functionality.

DETAILED DESCRIPTION OF THE INVENTION

Figure 1:
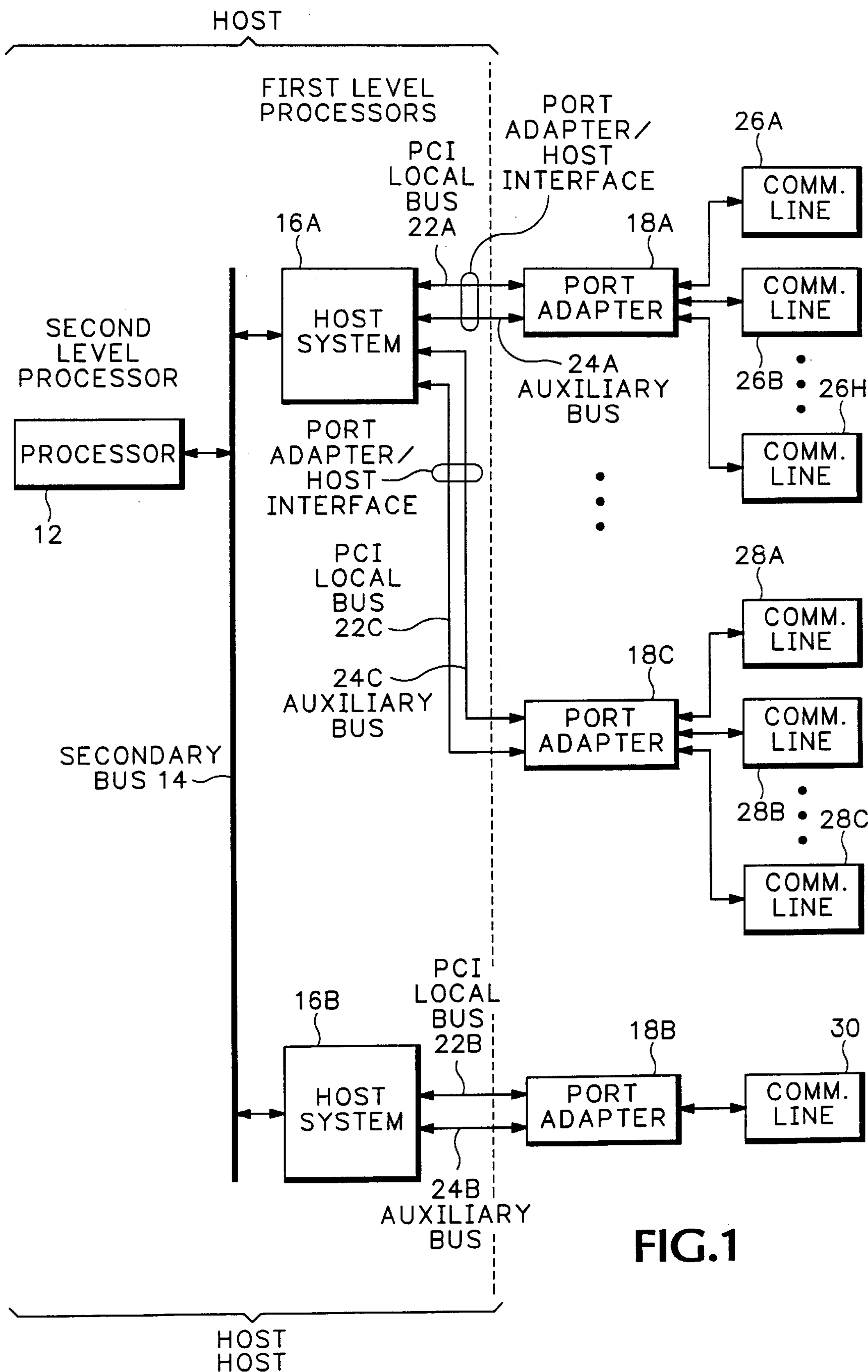
FIG. 1 is a block diagram of port adapters according to the invention coupled to a host system.

FIG. 1 is a block diagram showing a port adapter 18A connected to a host system according to the invention. A port adapter/host interface comprises a 32 bit PCI local bus 22A and an auxiliary bus 24A each coupled between the port adapter 18A and a host 16A. One or more communication lines 26A–26H are coupled to the port adapter 18A.

One or more additional port adapters are optionally coupled to the host 16A each through a separate PCI local bus and separate auxiliary bus. Port adapter 18C represents at least one additional port adapter connected via PCI local bus 22C and auxiliary bus 24C to host 16A. Communication lines 28A–28C are coupled to the port adapter 18C.

A secondary bus 14 couples a second host 16B and a second level processor 12 to host 16A. Host 16B is coupled by a PCI local bus 22B and an auxiliary bus 24B to a port adapter 18B. The port adapter 18B is similar to port adapters 18A and 18C and is coupled to a communication line 30.

In one embodiment of the invention, communication lines 26A–26H, 28A–28C and 30 comprise local area networks (LANs) like ethernet and token ring networks or wide area networks. In another embodiment of the invention, a port adapter may not necessarily connect to communication lines. The port adapter may alternatively contain logic for preforming alternative functions. For example, data encryption/decryption and data compression/decompression logic on the port adapter can be used to process data transferred over the PCI local bus.

The PCI local bus 22A transfers commands and data between the communication line controllers (not shown) for communication lines 26A–26H and the host 16A. The PCI local bus protocol is described in detail in the PCI Local Bus Specification available from the PCI Special Interest Group and is hereby incorporated by reference.

The auxiliary bus 24A is used by the processor 16A to identify the port adapter type, serial number and hardware revision. The auxiliary bus 24A is also used for conducting hot swap operations, JTAG testing and programming logic that may be included on the port adapter and are described in detail below.

The first level hosts (processors 16A and 16B), secondary bus 14 and second level processor 12 are all defined as a host or host system. In an alternative embodiment, there are not two processor levels and the host system comprises a single host coupled directly to the port adapter.

Figure 2:
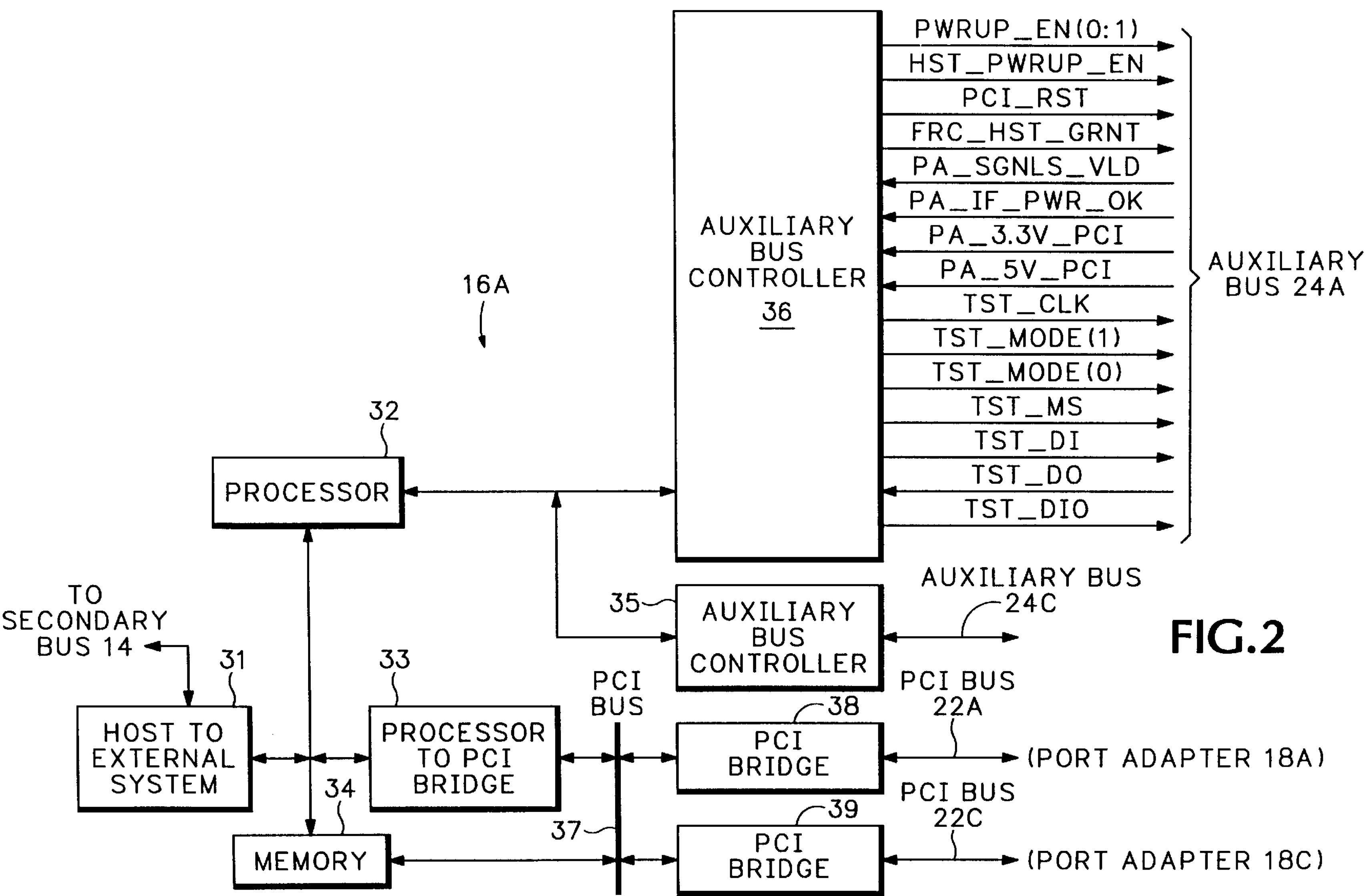
FIG. 2 is a detailed block diagram for a host shown in FIG. 1.

FIG. 2 is a detailed block diagram for one of the hosts 16A shown in FIG. 1. A processor 32 is coupled to a memory 34, a bridge 31 and a processor to PCI bridge 33. The memory 34 and bridge 33 are also connected directly to the PCI bus 37. The bridge 31 is connected to secondary bus 14. A PCI bridge 38 and a PCI bridge 39 are each coupled at a first end to PCI bus 37. PCI bridge 38 is connected at a second end to port adapter 18A through PCI local bus 22A and PCI bridge 39 is connected at a second end to port adapter 18C (FIG. 1) through PCI local bus 22C. A separate PCI bridge is used to connect each port adapter to host 16A.

Separate auxiliary bus controllers 36 and 35 couple the processor 32 to each auxiliary bus 24A and 24C, respectively, and are described in detail below.

Memory 34 is used for temporary storage for data and data descriptors that are passed between port adapters 18A–18C or between the port adapters and processor 16A. Memory 34 is also used to store command lists, queues and status data.

The PCI to PCI bridges may be the commercially available integrated circuits sold by the Digital Equipment Corporation under the designation type 21050. The PCI bridges 38 and 39 are located on the host side of the port adapter/host interface and control the signal levels on the PCI local buses 22A and 22C even when no port adapter is connected. Thus, the PCI bridges 38 and 39 can safely set signals on the PCI local bus preventing damage to both the host and the port adapters when the port adapter is plugged into a powered host during a hot swap operation.

PCI bridge circuits are known to those skilled in the art and are available from a number of merchant semiconductor companies, such as Digital Equipment Corporation. The PCI bridge circuits 38 and 39 are described in detail in the PCI to PCI Bridge Architecture Specifications Rev. 1.0 Apr. 5, 1994 available from the PCI Special Interest Group, 5200 Elam Young Parkway, Hillsboro, Oreg.

Figure 3:
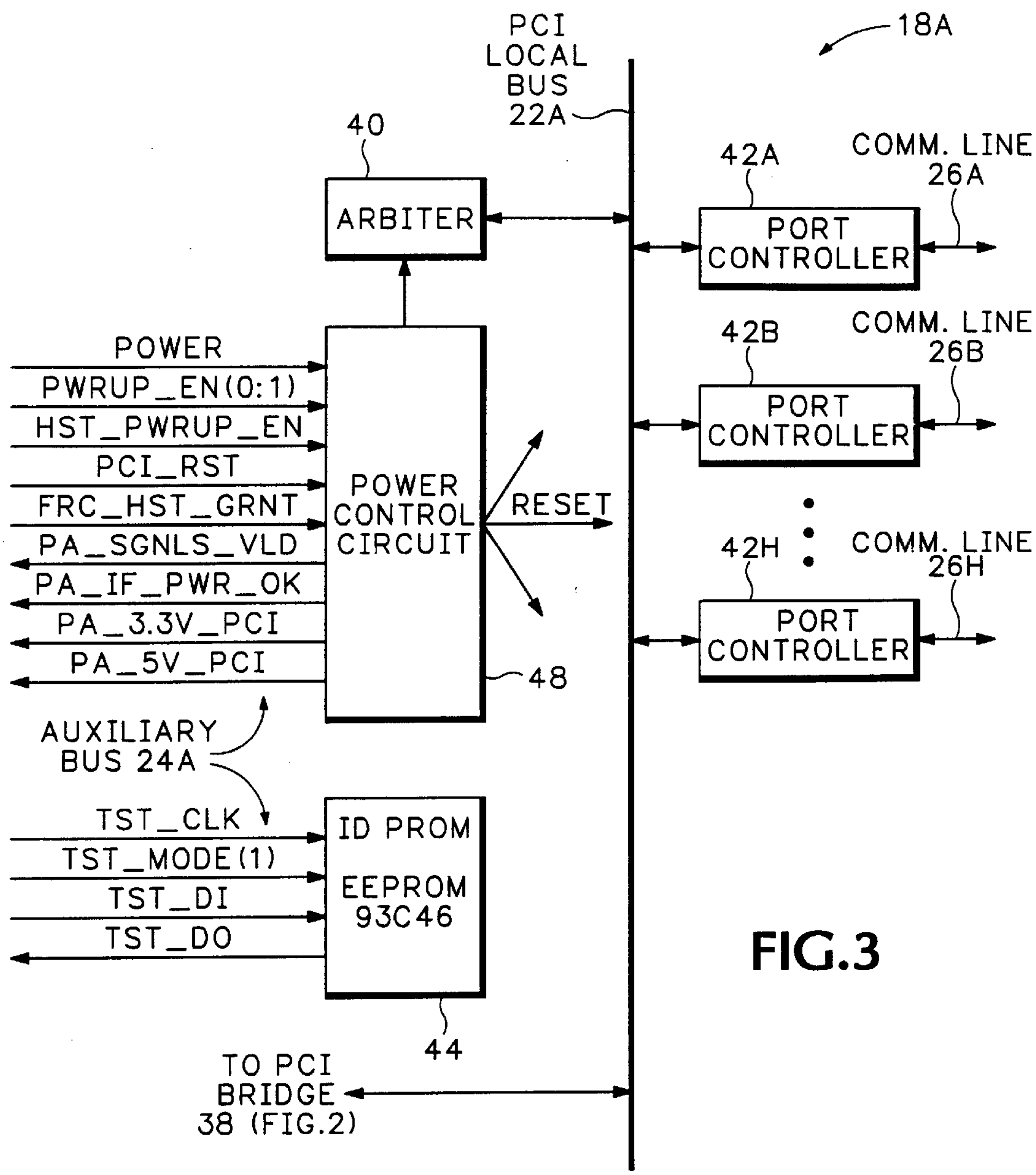
FIG. 3 is a detailed block diagram for one of the port adapters shown in FIG. 1.

FIG. 3 is a detailed block diagram for one of the port adapters 18A shown in FIG. 1. Multiple port controllers 42A–42H connect the communication lines 26A–26H, respectively, to PCI local bus 22A. Port controllers 42A–42H represent one or more PCI agents used for interfacing communication lines to a PCI local bus. The PCI local bus 22A is coupled to the port controllers 42A–42H and the PCI bridge 38 (FIG. 2).

Local Bus Arbiter

A PCI local bus arbiter 40 determines when each device gets access to the PCI local bus for data and task transfer. For example, the port controllers 42A–42H and the bridge 38 in processor 16A operate on the PCI local bus 22A according to standard PCI local bus protocol described in the PCI Local Bus Specification.

The following is one example of arbitration priorities and is only one of a variety of arbitration priorities that might be used in this invention. Arbiter 40 assigns highest arbitration priority to bridge 38 in processor 16A (FIG. 2) and assigns lower arbitration priorities to requests from the port controllers 42A–42H. The arbiter 40 provides port controllers 42A–42H access to the PCI local bus 22A according to their bandwidth and latency requirements. If all of the port controllers 42A–42H are the same type, the arbiter 40 gives equal access to each port controller using an arbitration scheme such as round-robin. If no device is requesting access to the PCI local bus 22A, the arbiter 40 parks the host bridge 38 on the PCI local bus 22A. This insures that bus signals are driven to valid levels and helps minimize the access latency of the processor 16A on the PCI local bus.

Test Port

Of particular significance to the present invention is the test port which comprises a portion of the auxiliary bus 24A and is coupled to an identification programmable read only memory 44 (ID PROM 44). The ID PROM 44 is a commercially available serial EEPROM sold by the National Semiconductor Corporation under the designation type 93C46. The test port includes seven auxiliary bus lines identified in FIGS. 1, 2 and 3 and which operate as defined below:

TST_CLK: Test Port Clock. Timing reference for the ID PROM and other test port circuitry.

TEST_MODE[1:0]: Test Port Mode[1:0]. Controls the operations and functionality of the test port. For example, the test port mode lines may enable the ID PROM 44 for reading or writing.

TST_MS: Test Mode Select. Depends on the functionality implemented by the test port. For example, the TST_MS line can be used as the JTAG MODE_SELECT signal.

TST_DI: Test Data In. TST_DI is a serial data input to the port adapter used for programming through the test port.

TST_DIO: Test Data Input/Output. TST_DIO is a bidirectional line and may be driven by either the port adapter test port or by the processor 32 in processor 16A. The meaning of TST_DIO depends on the functionality implemented by the test port.

TST_DO: Test Data Out. TST_DO is a serial data output from the test port to the host. One use of the signal on the TST_DO line is to identify to the host 16A the specific type of port adapter. For example, when the ID PROM 44 is accessed, TST_DO is driven by the ID PROM 44 and sends ID information to the host. When the ID PROM 44 is not being accessed, the meaning of TST_DO depends on other circuitry, if any, implemented in the test port.

The ID PROM 44 allows the processor 16A to determine what type of port adapter is connected so the host can determine what type of configuration, if any, is needed and what configuration algorithm to use. Specifically, the ID PROM 44 contains information about the port adapter type, hardware revision level, serial number, manufacturing datecode and the manufacturing test and repair history of the adaptor. Some of the test port signals may vary from port adapter to port adapter depending on the implemented test port functionality for the communication lines. Thus, the ID PROM 44 allows in-circuit programming by the processor 16A for customized configuration of each port adapter.

To read data from the ID PROM and write data into the ID PROM (i.e., program the ID PROM), the TST_MODE [1] line and the TST_CLK are used to first indicate to the ID PROM 44 that data or commands are being sent serially over the TST_DI line. The TST_DI line then commands the ID PROM 44 to either read or write data at an identified address location. For a write command, the processor 16A serially sends the data over the TST_DI line to the identified address location. For a read command, the ID PROM 44 sends data at the identified EEPROM address location to the processor 16A over the TST_DO line.

Test port functionality and some of the test port signals are permitted to vary from one port adapter to another. As a consequence, the identity of a port adapter must be determined in order to know what test functionality is implemented and what programming/configuration is needed. This requires that the method of accessing the ID PROM 44 must be the same for all port adapters.

To minimize the number of signals in the test port and minimize restrictions on how signals are used, a standard initialization sequence is used to insure that the test port circuitry on the port adapter is in a known state before accessing the test port. This initialization routine, for example, allows the ID PROM output data and output data from other test port circuitry to connect to the same TST_DO line on the same port adapter without contention.

Hot Swap

A power control circuit 48 allows on-line insertion and removal of the port adapter 18A into the port adapter/host connector of a powered host 16A (hot swap). Lines coupled to the power control circuit 48 are included in the auxiliary bus 24A and separate from the PCI local bus 22A. The power control circuit 48 is coupled through the auxiliary bus to the auxiliary bus controller 36 (FIG. 2). The power control circuit includes integrated circuits sold by Motorola under the designation MC34064, Maxim and Analog Devices under the designation MAX705 and a commercially available 74HCT151 device.

Auxiliary bus lines used for conducting hot swap operations between the processor 16A and the port adapter 18A are defined below:

PWRUP_EN[1:0]: Power-up Enable. PWRUP_EN[1:0] are two of the signals used to control when the adapter draws power from the supply potentials used by the port adapter. PWRUP_EN[1:0] are assigned to two short pins in a connector 50 (see FIG. 5). The short pins are the last to make contact when the port adapter 18A is plugged into the processor 16A and are the first pins to break contact when the port adapter is removed from the processor 16A.

HOST_PWRUP_EN: Host Power-up Enable. HOST_PWRUP_EN is asserted by the processor 16A only when the host side of the port adapter/host interface is fully powered. The host power-up enable line is one of several lines that determine when the port adapter draws power from the +5.15 and +12.2 volt supply potentials in the port adapter/processor 16A connector 50.

PA_SGNLS_VLD: Port Adapter Signal Valid. Indicates when signals in the port adapter/host interface sourced by the port adapter, including PCI local bus signals sourced by the port adapter, are valid, invalid or about to become invalid.

PA_IF_PWR_OK: Port Adapter Interface Power OK. Indicates power level on the port adapter is within or outside specification.

FRC_HOST_GRNT: Force Host PCI Local Bus Grant. A line driven by the processor 16A to control access to the PCI local bus 22A. When the FRC_HOST_GRNT line is asserted, the arbiter 40 ignores all requests for access to the PCI local bus and grants the PCI local bus to the processor 16A. When the FRC_HOST_GRNT line is deasserted, the arbiter 40 recognizes all requests for access to the PCI local bus and grants access to the bus according to standard arbitration protocol.

A 3.3 Volt and a 5.0 Volt signaling environment are each defined in the PCI Local Bus Specification. The two signaling environments are not electrically compatible. Accidentally connecting devices from the two signaling environments on the same PCI local bus can damage the devices.

Two signals on the host 16A and two signals from the power control circuit 48 on the port adapter 18A identify the two signaling environments as follows:

HOST_3.3V_PCI: Host 3.3 Volt PCI Local Bus Compatible. HOST_3.3V_PCI indicates whether the PCI local bus agent on the host side of the port adapter/host interface is compatible with the PCI local bus 3.3 Volt signaling environment.

HOST_5V_PCI: Host 5 Volt PCI local Bus Compatible. HOST_5V_PCI indicates whether the PCI local bus agent on the host side of the port adapter/host interface is compatible with the PCI local bus 5 Volt signaling environment.

PA_3.3V_PCI: Port Adapter 3.3 Volt PCI local Bus Compatible. PA_3.3V_PCI is driven by the port adapter and indicates whether the PCI local bus agents on the port adapter are compatible with the PCI local bus 3.3 Volt signaling environment.

PA_5V_PCI: Port Adapter 5 Volt PCI local Bus Compatible. PA_5V_PCI is driven by the port adapter and indicates whether the PCI local bus agents on the port adapter are compatible with the PCI local bus 5.0 Volt signaling environment.

Assertion of either PA_3.3V_PCI or PA_5V_PCI indicates to the host 16A that the port adapter 18A is installed. The PA_3.3V_PCI or PA_5V_PCI signals operate in such a manner that they can be read by the host regardless of whether the port adapter is powered or unpowered.

Referring to FIG. 4, JTAG testing is conducted from the processor 16A through the auxiliary bus 24A. A JTAG port on selected PCI devices, such as the port controllers 42A–42H, are connected to a test port controller 46. The test port controller 46 generates signals via the auxiliary bus 24A that control JTAG testing on the PCI devices. The JTAG protocol is specified by I.E.E.E. standard 1149.1 which defines a method for testing devices on the port adapter 18A.

A field programmable logic device 47 is connected to con-roller 46 and used to implement part of the port adapter's functionality. The functionality of the field programmable logic device 47 is determined by data stored in an internal static ram which is part of the logic device. When the port adapter is powered on, the static ram is reprogrammed by the host 16A using the test port auxiliary bus 24A. The processor 32 in host 16A (FIG. 2) sends configuration instructions and configuration data to the test port over auxiliary bus 24A.

In addition to field programmable logic devices that store their configuration in volatile static RAM and must be programmed after each power-up, there are field programmable logic devices that store their configuration in non-volatile EEPROM which does not require programming after each power-up, but may be reprogrammed in the field to fix bugs or add functionality. Either type of device can be programmed through the test port of the auxiliary bus. For example, a port controller can be implemented with an FPGA that is programmed through the auxiliary bus in addition to the FPGA 47.

The field programmable logic device can be used as control between different communication lines and the PCI local bus. Alternatively, the logic device can operate as a data compression/decompression for compressing and decompressing data or a data encryption/decryption engine.

Figure 5:
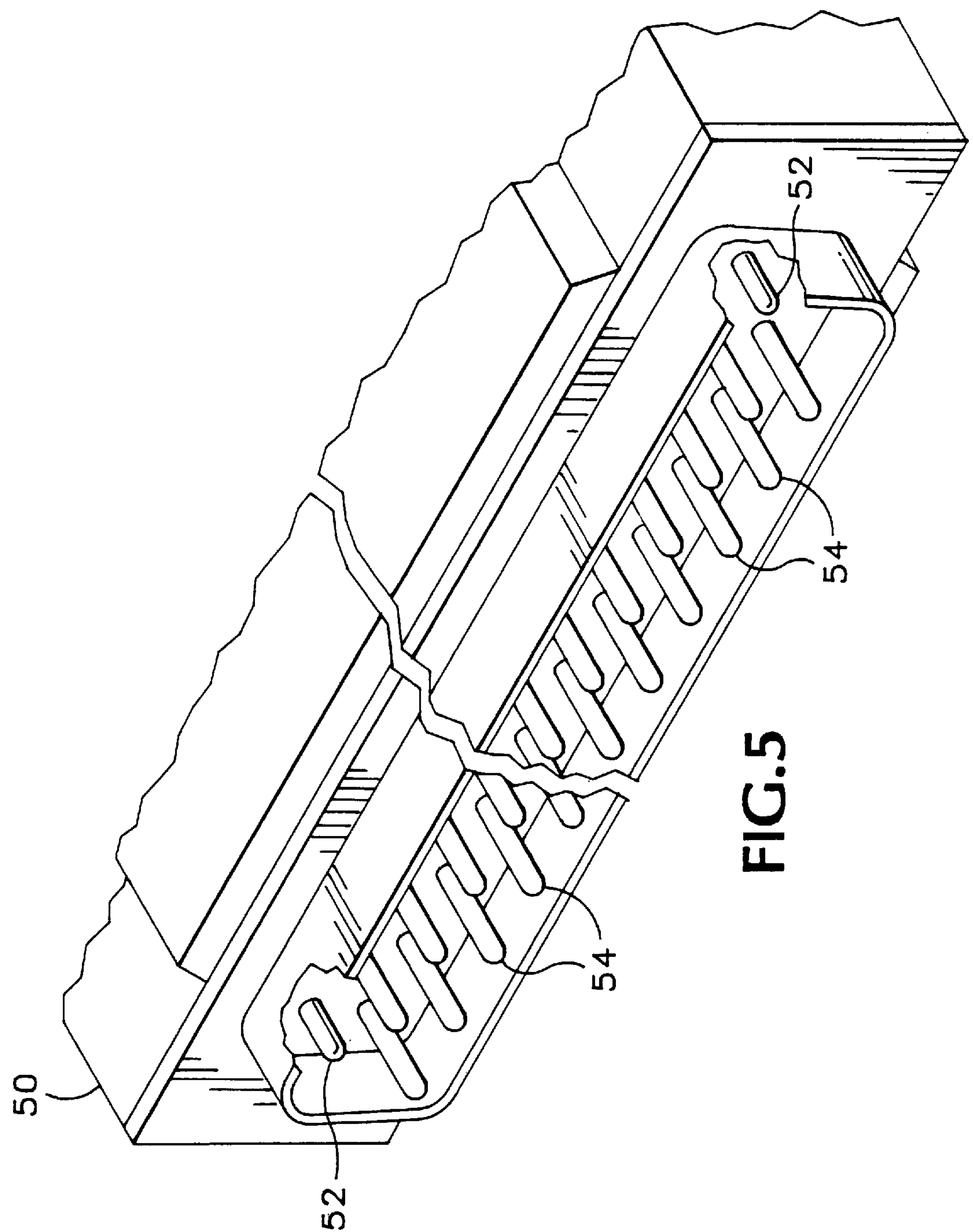
FIG. 5 is a perspective view of a port adapter connector.

FIG. 5 is a diagram of a connector 50 on the port adapter 18A that plugs into the processor 16A. The connector 50 includes pins 54 used for connecting the PCI local bus 22A to the PCI bridge 38 and the auxiliary bus 24A to the auxiliary bus controller 36 in processor 16A. Two of the connector pins 52 are shorter than the rest of pins 54. Pins 52 are located on opposite ends of the connector 50 and connect to the PWRUP_EN[1] and PWRUP_EN[0] lines described above. The connector is sold by AMP Corporation and is designated as an AMP Champ 0.050 Series Low-Profile docking connector.

The PWRUP_EN[1] and PWRUP_EN[0] lines connected to the short pins 52 must be asserted by the host system before the port adapter begins power-up. Pins 52 are shorter than the pins 54 and located on opposite ends of connector 50. If connector 50 is misaligned, the PWRUP_EN[1] and PWRUP_EN[0] lines will not be asserted and the port adapter will not power-up.

When the port adapter 18A is plugged in, the power control circuit 48 looks at the HOST_3.3V_PCI and HOST_5V_PCI lines to determine the signaling environment of the host 16A. If there is an incompatibility between the signaling environment in port adapter and the host, the power control circuit 48 will not power-up.

Port Adapter Insertion

Referring to FIGS. 3, 4 and 5, when the connecter 50 from port adapter 18A is plugged into the processor 16A, all of the long pins 54 make contact to associated lines in a processor 16A receptor plug (not shown). The PWRUP_EN[1:0] are biased to the deasserted state by resistors on the adapter so that their state is well defined before the short connector pins make contact.

The host monitors the PA_3.3V_PCI and PA_5V_PCI lines to determine when a port adapter is installed and to determine the port adapter signaling environment. The processor 16A car report back to a host operator the status of a nonoperational port adapter. For example, the host 16A can convey to the operator that a card is plugged into the port adapter/host interface port but that the card did not power-up because of a signaling environment mismatch.

As soon as the ground and power pins on connector 50 are connected to ground and power in the host 16A, logic in the power control circuit 48 immediately turns on. The PWRUP_EN[1] and PWRUP_EN[0] are asserted (driven LOW) by the host 16A. The logic circuitry in power control circuit 48 detects when the connector 50 is fully inserted by detecting low states on the PWRUP_EN[1] and PWRUP_EN[0] lines.

Only after PWRUP_EN[1] and PWRUP_EN[0] are asserted (driven LOW) (i.e., short pins 52 make contact with the processor 16A), the power control circuit 48 begins a port adapter power-up sequence after the HOST_PWRUP_EN is asserted (driven HIGH) by the host 16A and after verifying compatible signaling environments between the host 16A and the port adapter 18A.

When the port adapter logic that interfaces to the host has powered up, the PA_IF_PWR_OK line is asserted by the port adapter 18A. The host 16A then turns on PCI clocks in the PCI local bus that go to the port adapter 18A. Other signals on the PCI local bus that had previously been driven to a high impedance state or an otherwise safe state are driven to normal states by the host 16A.

The power control circuit 48 keeps the RESET line continuously asserted during power-up or power-down. Once the voltages are fully powered up, the reset line continues to be asserted for a predetermined about of time, for example, 200 milliseconds. When the port adapter power-up and reset sequences are completed, the PA_SGNLS_VLD line is asserted by the port adapter 18A. The host must take the bridge out of reset for the port adapter reset to be deasserted. The bridge is taken out of reset when PA_IF_PWR_OK is asserted.

Port Adapter Removal

When the port adapter 18A is removed from a powered host 16A, the short pins 52 connected to the PA_PWRUP_EN[1] or PA_PWRUP_EN[0] lines are the first to disconnect from the receiving socket on the host 16A. The port adapter upon receiving a deasserted PA_PWRUP_EN[1] or PA_PWRUP EN[0] line immediately deasserts the PA_SGNLS_VLD line to the host 16A and begins a power-down operation.

Deassertion of the PA_SGNLS_VLD line is a warning to the host 16A that a hot swap extraction operation is beginning. A time delay built into the power control circuit 48, allow voltages in the port adapter to stay valid for a predetermined amount of time.

While the port adapter voltages are still within specification, the host 16A begins termination of PCI local bus transactions with the port adapter 18A. The host 16A asserts the FRC_HOST_GRNT line to the port adapter arbiter 40 through the power control circuit 48. The asserted FRC_HOST_GRNT line forces the arbiter 40 to grant the PCI local bus 22A to the host 16A and deny access to all other devices such as port controllers 42A–42H.

Typically, data communications on the port adapter PCI local bus 22A are terminated within 30 microseconds using standard protocols defined in the PCI Local Bus Specification. Because the connector 50 typically takes several milliseconds for removal from the host, 30 microseconds is sufficient to terminate communications on the PCI local bus 22A without corrupting data.

When PA_IF_PWR_OK is deasserted, drivers (not shown) on the host 16A side of the port adapter/host interface place a HIGH impedance state on all PCI local bus signals. After a few PCI local bus clock cycles, selected address, enable and parity are asserted (driven LOW) by the host 16A while remaining signals stay in a HIGH impedance state. This insures that excessive currents will not flow through the PCI local bus devices between a powered host 16A and an unpowered port adapter.

When the PA_IF_PWR_OK line is deasserted, the host 16A is notified that the voltage on the port adapter logic that interfaces with the host is no longer within specification. The processor 16A, in response, turns off the clocks on the PCI local bus.

While the invention has been shown with respect to preferred embodiments thereof, various changes in form and detail may be made without departing from the scope and spirit of the invention. The scope of the invention is defined by the appended claims.

We claim:

1. A method for controlling power up and power down operations in a port adapter, the method comprising:

asserting a valid condition signal when the port adapter is powered up;

detecting disconnection of the port adapter from a host system;

deasserting the valid condition signal to indicate the port adapter is beginning a power-down operation;

monitoring for a host access signal from the host system; and granting access to the port adapter only to the host system during the power-down operations and denying access to any other requesting devices when the host access signal is detected.

2. A method according to claim 1 including:

connecting a power-up enable signal to a short pin on a port adapter connector;

receiving a deasserted power-up enable signal when the short pin is disconnected from the host system before other pins on the connector are disconnected; and deasserting the valid signaling condition signal when the deasserted power-up enable signal is detected.

3. A method according to claim 1 including:

receiving an indicator of a signaling environment for the host system; and aborting the port adapter power-up operations when a port adapter signaling environment is incompatible with the host system signaling environment.

4. A method according to claim 1 including:

connecting devices to the host system through a local bus in the power adapter;

connecting power control circuitry that controls the power-up and power-down operations in the port adapter to the host system through an auxiliary bus in the port adapter; and transmitting data between the devices and the host system over the local bus while controlling the power control circuitry through the auxiliary bus independently of the local bus.

5. A method according to claim 3 including:

supporting two separate operational power levels in the port adapter;

checking the operational power level on the host system with the port adapter; and powering up the port adapter when the port adapter and the host system have the same operational power level and preventing power-up of the port adapter when the port adapter and the host system have different operational power levels.

6. A method for hot swapping a port adapter with a host system, comprising:

monitoring for a power-up enable signal when the port adapter starts being electrically attached to the host system;

initiating a port adapter power-up sequence when the power-up enable signal is detected;

asserting a power OK signal from the port adapter to the host system when the port adapter has powered up to an operational condition;

asserting a valid signal when the local bus is ready for transferring data;

monitoring for deassertion of the power-up enable signal when the port adapter first begins disconnecting from the host system;

deasserting the signal valid signal when the power-up enable signal is deasserted to begin a port adapter power-down operation;

receiving a host grant signal from the host system when the signal valid signal is deasserted and port adapter voltages are still within an operational state for conducting data transfers over the local bus, the host grant signal forcing an arbiter on the port adapter to grant the local bus on the port adapter to the host system and deny access to other devices coupled to the local bus; and deserting the power OK signal to indicate that the port adapter is no longer in the operational state.

7. A method according to claim 6 including:

supporting two separate operational power levels on the local bus;

checking the operational power level on the host system with the port adapter; and powering up the port adapter only when the port adapter and the host system have the same operational power level.

* * * * *